United States Patent
Aoki (10) Patent No.: US 10,454,988 B2
(45) Date of Patent: Oct. 22, 2019

(54) COMMUNICATION APPARATUS, COMMUNICATION SYSTEM, AND METHOD FOR CONTROLLING DATA COMMUNICATION

(71) Applicant: Shinji Aoki, Kanagawa (JP)

(72) Inventor: Shinji Aoki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 334 days.

(21) Appl. No.: 15/374,038

(22) Filed: Dec. 9, 2016

(65) Prior Publication Data

US 2017/0171283 A1    Jun. 15, 2017

(30) Foreign Application Priority Data

Dec. 15, 2015  (JP) ................................. 2015-244448
Feb. 22, 2016  (JP) ................................. 2016-031270

(51) Int. Cl.
*H04L 29/06*      (2006.01)
*H04L 12/26*      (2006.01)

(52) U.S. Cl.
CPC ........ *H04L 65/607* (2013.01); *H04L 43/0894* (2013.01); *H04L 43/16* (2013.01); *H04L 65/601* (2013.01)

(58) Field of Classification Search
CPC .................................................. H04L 65/607
See application file for complete search history.

(56) References Cited

U.S. PATENT DOCUMENTS

| | | | |
|---|---|---|---|
| 2002/0004840 A1* | 1/2002 | Harumoto | H04L 47/10 709/231 |
| 2011/0141500 A1* | 6/2011 | Togami | H04N 1/6002 358/1.9 |
| 2014/0044189 A1* | 2/2014 | Pearlstein | H04N 19/105 375/240.16 |

FOREIGN PATENT DOCUMENTS

JP         2005-092258         4/2005

* cited by examiner

*Primary Examiner* — Moustafa M Meky
*Assistant Examiner* — Sm Z Islam
(74) *Attorney, Agent, or Firm* — Oblon, McClelland, Maier & Neustadt, L.L.P.

(57) ABSTRACT

A communication apparatus includes a receiver and circuitry. The receiver receives image data from a transmission apparatus. The circuitry identifies an image data type of the image data received by the receiver, and determines a transmission data capacity to be used for transmission of the image data at the transmission apparatus based on the identified image data type. The circuitry further sends a notification to the transmission apparatus, the notification requesting the transmission apparatus to transmit the image data based on the determined transmission data capacity, and outputs the image data that the transmission apparatus transmits based on the notified transmission data capacity.

14 Claims, 10 Drawing Sheets

COMMUNICATION APPARATUS, COMMUNICATION SYSTEM, AND METHOD FOR CONTROLLING DATA COMMUNICATION

CROSS-REFERENCE TO RELATED APPLICATIONS

This patent application is based on and claims priority pursuant to 35 U.S.C. § 119(a) to Japanese Patent Application Nos. 2015-244448, filed on Dec. 15, 2015 and 2016-031270, filed on Feb. 22, 2016 in the Japan Patent Office, the entire disclosures of which are hereby incorporated by reference herein.

BACKGROUND

Technical Field

The present disclosure relates to a communication apparatus, a communication system, and a method for controlling data communication.

Description of the Related Art

A device is known that receives image data from at least one external device and displays images on a screen based on the received image data. This device sequentially reads out the image data transferred from the external device(s) and displays the images one by one in each of a plurality of areas on the screen.

Usually, an upper limit is placed on a bandwidth for communication between a plurality of transmitter apparatuses and a receiver apparatus. In a case in which each transmitter apparatus transmits image data with type identification information indicating an attribute of the image data to be transmitted attached, the receiver apparatus allocates a suitable bandwidth to each transmitter apparatus. Accordingly, the communication bandwidth having the upper limit is used in an effective manner.

However, in a case in which each transmitter does not attach the type identification information to the image data, when the amount of image data exceeds the upper limit of the bandwidth due to the number of transmitter apparatuses or the contents of the image data, the receiver apparatus usually reduces an refresh frequency (frame rate) of the entire screen.

However, the optimal frame rate varies depending on the content of the image data. Accordingly, if the frame rate of the entire screen is uniformly reduced, the reduced frame rate may be too low for a certain type of contents of the image data while the reduced frame rate may be too high for another type of contents of the image data.

SUMMARY

A communication apparatus includes a receiver and circuitry. The receiver receives image data from a transmission apparatus. The circuitry identifies an image data type of the image data received by the receiver, and determines a transmission data capacity to be used for transmission of the image data at the transmission apparatus based on the identified image data type. The circuitry further sends a notification to the transmission apparatus, the notification requesting the transmission apparatus to transmit the image data based on the determined transmission data capacity, and outputs the image data that the transmission apparatus transmits based on the notified transmission data capacity.

BRIEF DESCRIPTION OF THE DRAWINGS

A more complete appreciation of the embodiments and many of the attendant advantages and features thereof can be readily obtained and understood from the following detailed description with reference to the accompanying drawings, wherein.

The accompanying drawings are intended to depict embodiments of the present invention and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the multiple forms as well, unless the context clearly indicates otherwise.

Several exemplary embodiments of the present invention are described hereinafter with reference to drawings.

Figure 1:
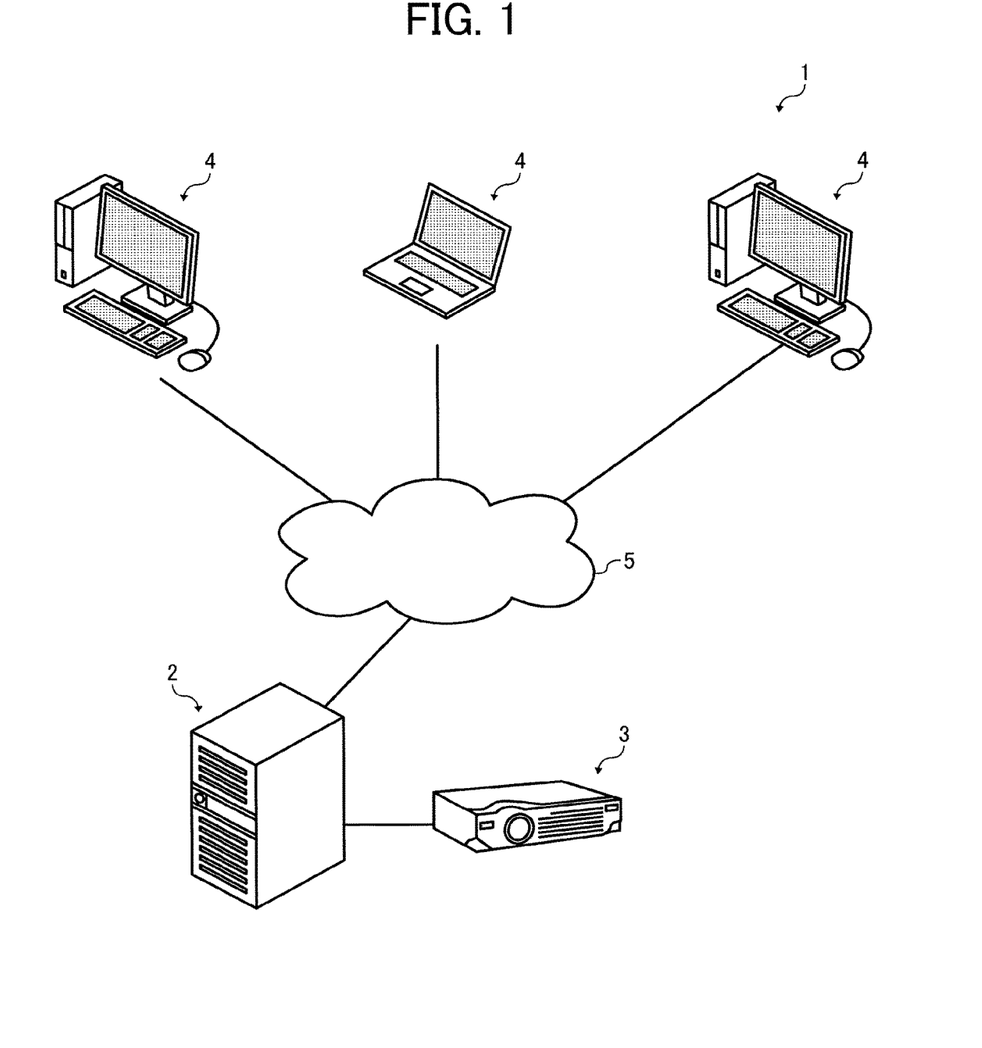
FIG. 1 is a schematic diagram illustrating a configuration of a communication system according to an embodiment of the present invention.

First, a description is given of an overview of a communication system 1 according to an embodiment of the present invention. FIG. 1 is a schematic diagram illustrating a configuration of the communication system according to an embodiment of the present invention. As illustrated in FIG. 1, the communication system 1 includes a communication apparatus 2 and a plurality of transmission apparatuses 4. The communication apparatus 2 and the transmission apparatuses 4 are connected to a network 5. Further, a display apparatus 3 is connected to the communication apparatus 2.

The display apparatus 3 displays an image based on signals output from the communication apparatus 2. The display apparatus 3 may display a plurality of images one by one in each of a plurality of areas on a large screen such that one can visually percept each image. However, the display apparatus like this is merely one example, and any other display apparatus may be used in the communication system 1. Thus, a projector that projects an image onto a screen from a light source is one example of the display apparatus 3 that is capable of displaying the image on the large screen.

The network 5 is a wireless or wired network that connects a plurality of devices to enable communication between the devices. The network 5 may be implemented by the Internet such as the Ethernet (registered trademark) and a wireless fidelity (Wi-Fi, registered trademark). However, these are merely examples, and any other appropriate configuration may implement the network 5.

It should be noted that although in FIG. 1 the communication system includes four transmission apparatuses 4, alternatively there may be more or fewer than four transmission apparatuses 4.

Hereinafter, a description is given of hardware configurations of the communication apparatus 2 and the transmission apparatus 4 according to the present embodiment. Hereinafter, a description is given of hardware configurations of the communication apparatus 2 and the transmission apparatus 4 according to the present embodiment.

Figure 2:
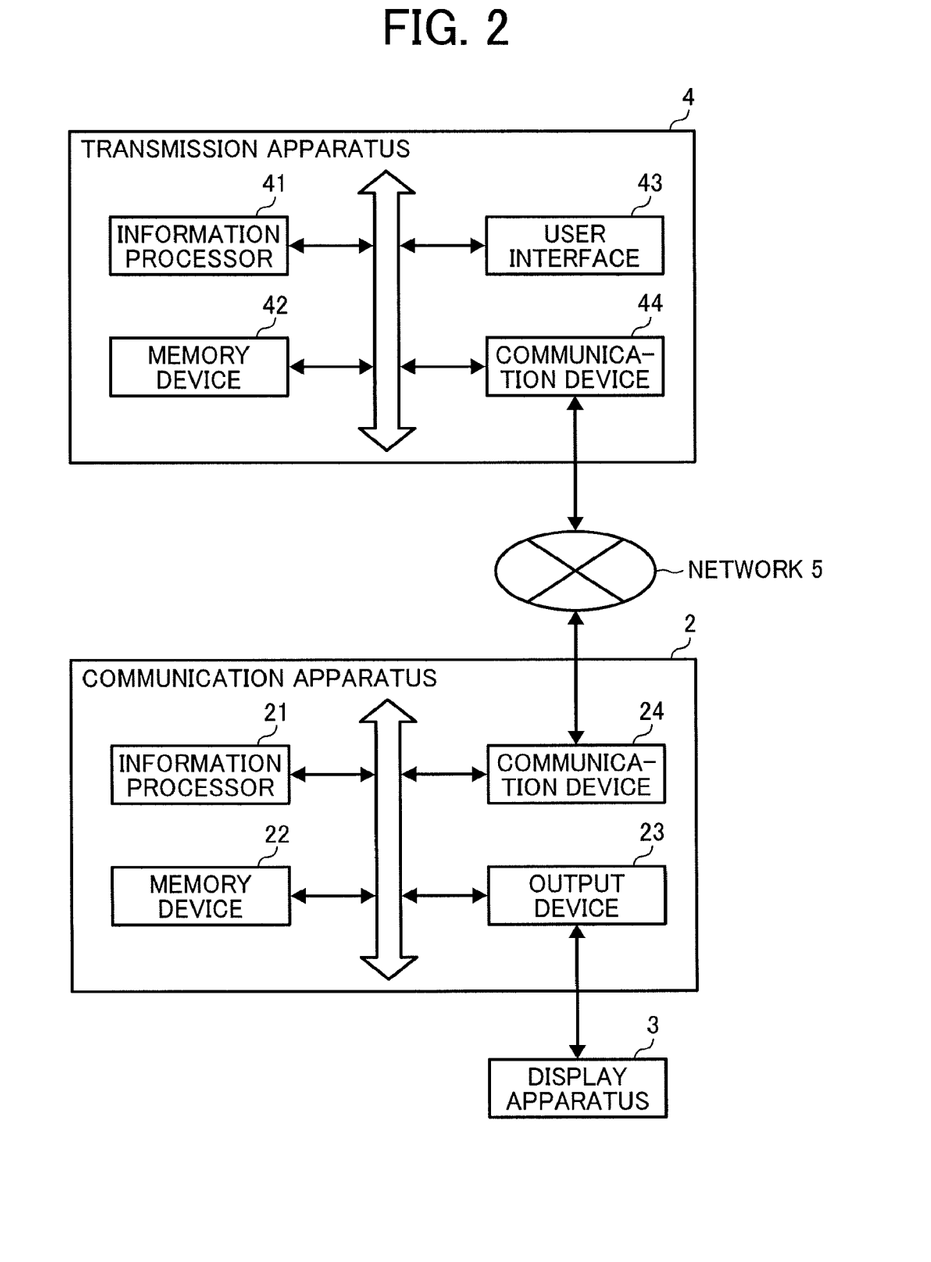
FIG. 2 is a block diagram illustrating hardware configurations of a communication apparatus and a transmission apparatus included in the communication system of FIG. 1.

As illustrated in FIG. 2, the communication apparatus 2 includes an information processor 21, a memory device 22, an output device 23, and a communication device 24. Further, the transmission apparatus 4 includes an information processor 41, a memory device 42, a user interface (UI) 43, and a communication device 44. The communication apparatus 2 and the transmission apparatus 4 may be implemented by an information processing apparatus having a communication capability. Examples of the information processing apparatus include a personal computer, a server, a tablet computer, and a smartphone. However, these are exemplary, and the communication apparatus 2 and the transmission apparatus 4 may be implemented by any other device or apparatus having capabilities described later.

The information processor 21 of the communication apparatus 2 performs operations on codes included in a program to execute various types of processing described later. The information processor 21 is implemented, for example, by a processor such as a central processing unit (CPU) that executes the program loaded into a memory such as a random access memory (RAM).

The memory device 22 of the communication apparatus 2 is a non-volatile storage medium to store predetermined information that is read out as necessary. The memory device 22 stores programs executed by the information processor 21, for example. The memory device 22 is implemented, for example, by a hard disc drive (HDD) or a solid state drive (SSD).

The output device 23 of the communication apparatus 2 outputs a screen obtained by the processing by the information processor 21 to the display device to cause the display apparatus 3 to display the screen. The output device 23 is implemented, for example, by a graphics processing unit. Further, the output device 23 may also output audio to a reproduction device such as a speaker to cause the reproduction device to reproduce the audio.

The communication device 24 of the communication apparatus 2 performs communication with an external device via the network 5. For example, the communication device 24 receives image data from the transmission apparatus 4. The communication device 24 is implemented, for example, by a local area network (LAN) interface or a wireless LAN interface.

The information processor 41 of the transmission apparatus 4 performs operations on codes included in a program to execute various processing described later. The information processor 41 is implemented, for example, by a processor such as a central processing unit (CPU) that executes the program loaded to a memory such as a random access memory.

The memory device 42 of the transmission apparatus 4 is a non-volatile storage medium to store predetermined information that is read out as necessary. The memory device 42 stores programs executed by the information processor 41, for example. The memory device 42 is implemented, for example, by a hard disc drive (HDD) or a solid state drive (SSD).

The UI 43 of the transmission apparatus 4 accepts a user's instruction input to the information processor 41. The UI 43 is implemented by, for example, an input device such as a keyboard and a pointing device.

The communication device 44 of the transmission apparatus 4 performs communication with an external device via the network 5. For example, the communication device 24 transmits the image data to the communication apparatus 2. The communication device 44 is implemented, for example, by a local area network (LAN) interface or a wireless LAN interface.

Figure 3:
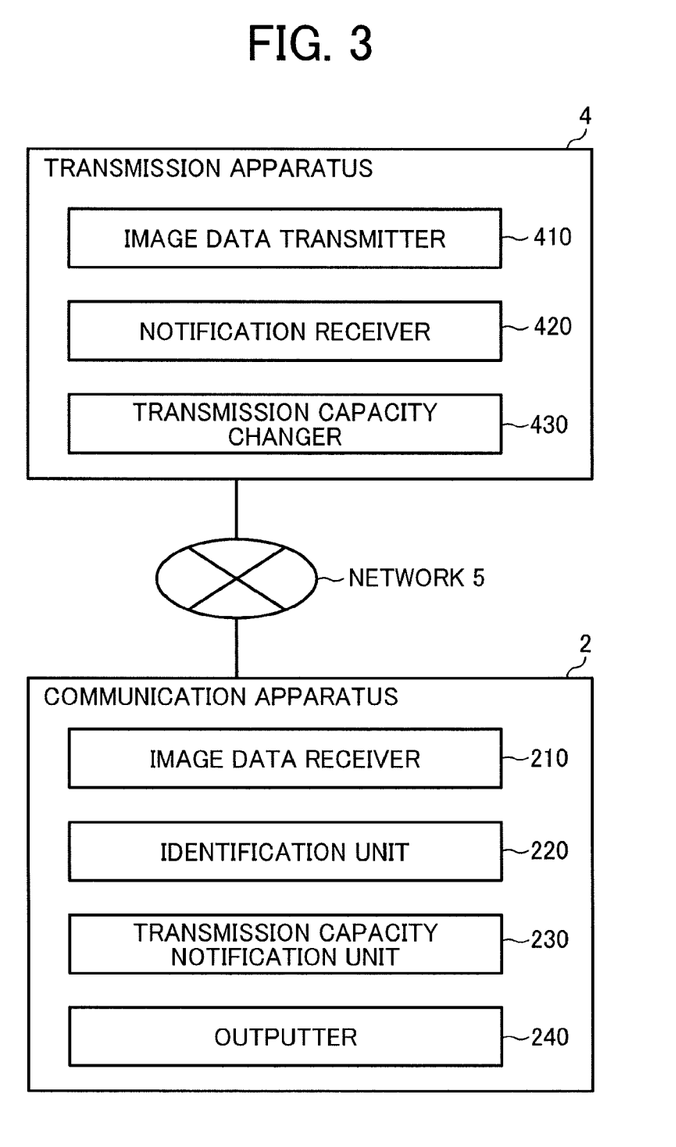
FIG. 3 is a block diagram illustrating functional configurations of the communication apparatus and the transmission apparatus according to an embodiment of the present application.

Hereinafter, a description is given of functional blocks of the communication apparatus 2 and the transmission apparatus 4 according to the present embodiment. FIG. 3 is a block diagram illustrating functional configurations of the communication apparatus 2 and the transmission apparatus 4 according to the present embodiment.

As illustrated in FIG. 3, the communication apparatus 2 includes an image data receiver 210, an identification unit 220, a transmission capacity notification unit 230, and an output unit 240. Further, the transmission apparatus 4 includes an image data transmitter 410, a notification receiver 420, and a transmission capacity controller 430.

The image data receiver 210 of the communication apparatus 2 receives the image data from the transmission apparatus 4. The image data receiver 210 is implemented by the communication device 24 operating under control of the information processor 21 according to a predetermined program.

The identification unit 220 of the communication apparatus 2 identifies a type of the image data received by the image data receiver 210. Examples of the type of the image data include monochrome binary image data, monochrome multivalent image data, and color image data. Alternatively, the type of image data may indicate whether the image data is text image data or non-text image data. Still alternatively, the type of image data may indicate whether the image data is video or a still picture. Still alternatively, the type of image data may indicate whether the image data is important or not important. The identification unit 220 is implemented by the information processor 21 when executing the predetermined program.

The transmission capacity notification unit 230 calculates transmission data capacity to be used for transmission of image data from the transmission apparatus 4 based on the type of image data identified by the identification unit 220.

Further, the transmission capacity notification unit 230 notifies the transmission apparatus 4 of the calculated data transmission capacity. A detailed description is given later of the calculation of the transmission data capacity based on the type of image data. The transmission capacity notification unit 230 is implemented by the information processor 21 when executing the predetermined program to determine the transmission data capacity to be used for transmitting the image data and the communication device 24 operating under control of the information processor 21 according to the predetermined program.

The output unit 240 of the communication apparatus 2 receives the image data that the transmission apparatus 4 transmits based on the transmission data capacity notified by the transmission capacity notification unit 230. Further, the output unit 240 outputs the received image data. The output unit 240 may output the image data to the display apparatus 3 to cause the display apparatus 3 to display an image based on the image data. The output unit 240 is implemented by the output device 23 operating under control of the information processor 21 according to the predetermined program.

The image data transmitter 410 of the transmission apparatus 4 sequentially transmits the image data. The image data transmitter 410 is implemented by the information processor 41 when executing the predetermined program to generate image data to be transmitted in accordance with an operation input to the UI 43 and the communication device 44 operating under control of the information processor 41.

The notification receiver 420 of the transmission apparatus 4 receives the notification including the notification of the data transmission capacity from the communication apparatus 2. The notification receiver 420 is implemented by the communication device 44 operating under control of the information processor 41 according to the predetermined program.

The transmission capacity controller 430 of the transmission apparatus 4 controls the transmission data capacity to be used for transmission of the image data based on the notification from the communication apparatus 2. The transmission capacity controller 430 is implemented by the information processor 41 when executing the predetermined program.

More specifically, the transmission capacity controller 430 changes a compression ratio of the image data or a frame rate of the image data to control the transmission data capacity.

Hereinafter, a description is given of steps in an operation performed by the communication apparatus 2 and the transmission apparatus 4 according to the present embodiment with reference to flowcharts of FIGS. 4A and 4B.

Figure 4A:
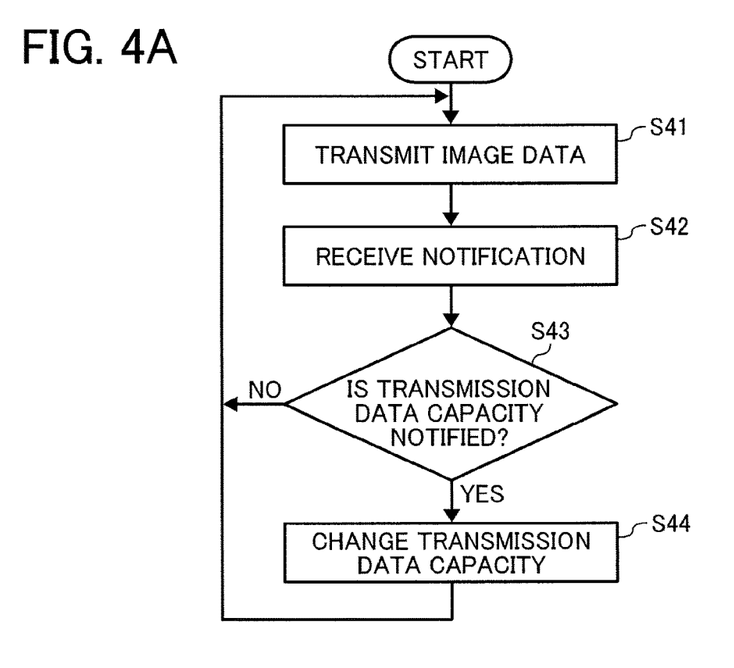
FIG. 4A is a flowchart illustrating steps in an operation performed by the transmission apparatus according to an embodiment of the present invention.

First, a description is given of the steps in an operation performed by the transmission apparatus 4 with reference to FIG. 4A.

The image data transmitter 410 of the transmission apparatus 4 transmits the image data to the communication apparatus 2 (S41).

Subsequently, the notification receiver 420 of the transmission apparatus 4 receives a notification of the transmission data capacity transmitted from the transmission apparatus 4 at S23 of FIG. 4B as described later (S42). In a case in which the notification receiver 420 receives no notification of the transmission data capacity (S43: NO), the processing returns to S41, and the transmission apparatus 4 continues transmission of the image data.

By contrast, in a case in which the notification receiver 420 receives the notification of the transmission data capacity from the communication apparatus 2 (S43: YES), the transmission apparatus 4 changes the transmission data capacity (S44). Then, the processing returns to S41, and the transmission apparatus 4 transmits, to the communication apparatus 2, the image data with the changed transmission data capacity.

Figure 4B:
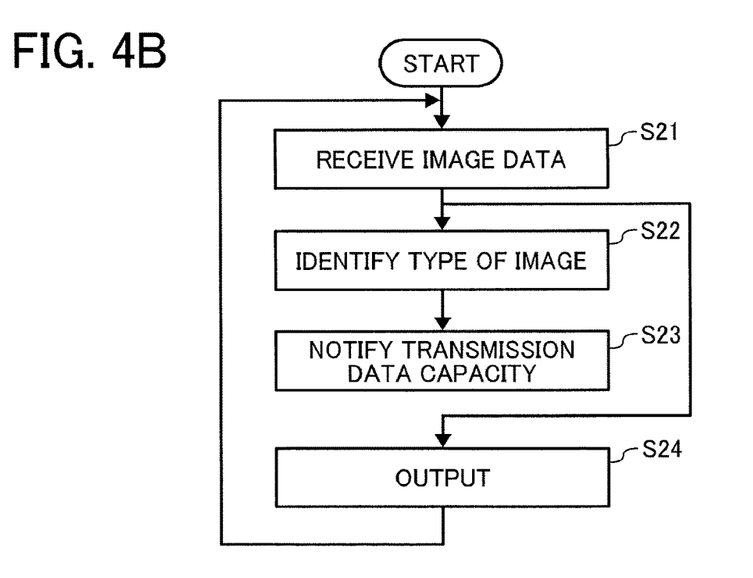
FIG. 4B is a flowchart illustrating steps in an operation performed by the communication apparatus according to an embodiment of the present invention.

Next, a description is given of the steps in an operation performed by the communication apparatus 2 with reference to FIG. 4B. The image data receiver 210 of the communication apparatus 2 receives the image data transmitted from the transmission apparatus 4 at S41 of FIG. 4A (S21). Subsequently, the identification unit 220 of the communication apparatus 2 identifies the type of the received image data (S22).

Then, based on the type of the image data identified at S22, the transmission capacity notification unit 230 of the communication apparatus 2 calculates the transmission data capacity with which the transmission apparatus 4 is to transmit the image data. The transmission capacity notification unit 230 notifies the transmission apparatus 4 of the calculated transmission data capacity (S23).

In the present embodiment, the transmission capacity notification unit 230 calculates the transmission data capacity based on whether the image data received from the transmission apparatus 4 is text image data or non-text image data. Specifically, the transmission capacity notification unit 230 reads pixel values of a part (top 5 lines, for example) of the received image data to predict whether the image data is text image data or non-text image data.

In a case in which the image data is text image data, characters are likely to be distorted, rendering text illegible due to reduction of the transmission data capacity. Accordingly, it is preferable not to reduce the transmission data capacity for the transmission apparatus 4 that transmits text image data. By contrast, in a case in which the image data is non-text image data, a non-text image is less likely to be distorted even when the transmission data capacity reduces. Accordingly, the transmission capacity notification unit 230 notifies the transmission apparatus 4 that transmits non-text image to reduce the transmission data capacity to be used for transmission of the image data.

For example, the transmission capacity notification unit 230 may notify the transmission apparatus 4 to reduce the transmission data capacity to a predetermine value. Alternatively, the transmission capacity notification unit 230 may calculate the transmission data capacity based on an amount of increase or decrease of the communication bandwidth, in a case in which the frame rate and the communication bandwidth satisfies a certain equation such as a ratio between the frame rate and the communication bandwidth being 10 fps to 10 Mbps.

More specifically, the transmission capacity notification unit 230 determines whether the received image data is monochrome binary data, monochrome multivalent data, or color image data based on the pixel values of the image data. Further, the transmission capacity notification unit 230 predicts that the image data that is identified as monochrome binary data is the text image data.

Image data satisfying both of the following equations is identified as monochrome binary data.

pixel value of $R$<threshold $R1$ && pixel value of $G$<threshold $G1$ && pixel value of $B$<threshold $B1$ pixel value of $R$>threshold $R2$ && pixel value of $G$>threshold $G2$ && pixel value of $B$>threshold $B2$ Image data satisfying both of the following equations is identified as monochrome multivalent data.

$$ABS(\text{pixel value of } R - \text{pixel value of } G) < \text{threshold } A1$$

$$ABS(\text{pixel value of } B - \text{pixel value of } G) < \text{threshold } B1$$

Image data that is identified as neither monochrome binary data nor monochrome multivalent data is identified as color image data.

Thus, the transmission capacity notification unit 230 determines whether the received image data is monochrome binary data, monochrome multivalent data, or color image data. The transmission capacity notification unit 230 calculates the transmission data capacity for transmitting the image data based on the prediction that the image data identified as monochrome binary data is text image data. Furthermore, the transmission capacity notification unit 230 calculates the transmission data capacity for transmitting the image data based on the prediction that the image data identified as either monochrome multivalent data or color image data is non-text image data.

Alternatively, the transmission capacity notification unit 230 may calculate, for the image data identified as one of monochrome binary data, monochrome multivalent data, and color image data, the transmission data capacity depending on the determination.

Each of the thresholds in the above equations may be modified depending on the particular attributes of applied systems.

Although a description has been given heretofore of predicting whether the received image data is text image data or non-text image data depending on the determination as to whether the image data is monochrome binary data, monochrome multivalent data, or color image data, this prediction is just one example. The prediction as to whether the received image data is text image data or non-text image data may be performed in other ways. For example, the image data may be identified as scanned data of a newspaper based on detection of a background color, and the transmission capacity notification unit 230 may predict that the image data is text image data based on this determination.

Furthermore, when the communication apparatus 2 receives difference data between continuous image data and combines the difference data, the transmission capacity notification unit 230 may calculate the transmission data capacity based on a size of a difference area that is transmitted as the difference data. The transmission capacity notification unit 230 predicts that the image data having the difference area exceeding a predetermined threshold is video. Based on this prediction, the transmission capacity notification unit 230 notifies the transmission apparatus 4 to reduce the transmission data capacity.

Still further, the transmission capacity notification unit 230 may calculate the transmission data capacity based on a data size of the image data. The transmission capacity notification unit 230 predicts that the image data having a size exceeding a predetermined threshold is video. Based on this prediction, the transmission capacity notification unit 230 notifies the transmission apparatus 4 to reduce the transmission data capacity.

This determination of the type of the image data may be performed on every frame of the received image data. Alternatively, this determination may be performed on every predetermined number of frames. Still alternatively, this determination may be made based on accumulated determination results for the latest predetermined number of frames instead of the determination result for each frame.

Concurrently with S22 and S23, the output unit 240 of the communication apparatus 2 outputs the received image data to the display apparatus 3 to cause the display apparatus 3 to display images based on the image data (S24). Then, the processing returns to S21, and the communication apparatus 2 receives the image data.

Figure 5:
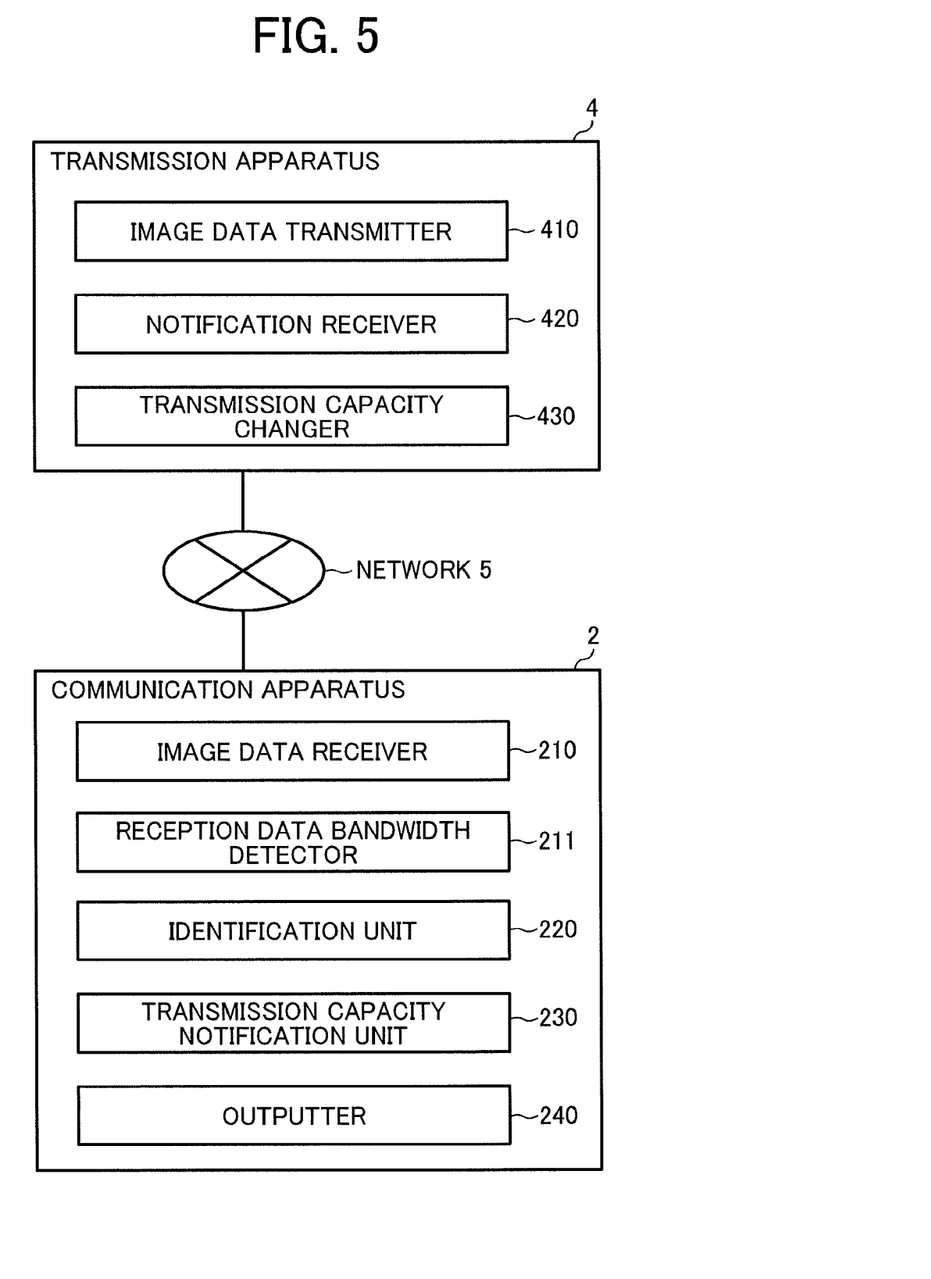
FIG. 5 is a block diagram illustrating functional configurations of the communication apparatus and the transmission apparatus according to another embodiment of the present application.

Hereinafter, a description is given of the communication system 1 according to another embodiment of the present invention. A description of elements, members, components, or operations that are same as those of the embodiment described above is omitted below. FIG. 5 is a block diagram illustrating functional configurations of the communication apparatus 2 and the transmission apparatus 4 according to the present embodiment. As illustrated in FIG. 5, the communication apparatus 2 according to the present embodiment includes a reception data bandwidth detector 211 in addition to the functional blocks of FIG. 3.

The reception data bandwidth detector 211 detects a reception data bandwidth used by the image data receiver 210 to receive the image data from the transmission apparatus 4. The reception data bandwidth detector 211 is implemented by the communication device 24 operating under control of the information processor 21 according to a predetermined program.

In the present embodiment, the transmission capacity notification unit 230 notifies the transmission apparatus 4 of the transmission data capacity when the reception data bandwidth exceeds a predetermined threshold. With this aspect, no bandwidth control is performed on transmission of the image data until the reception data bandwidth becomes scarce. Accordingly, no deterioration of displayed images occurs.

Figure 6:
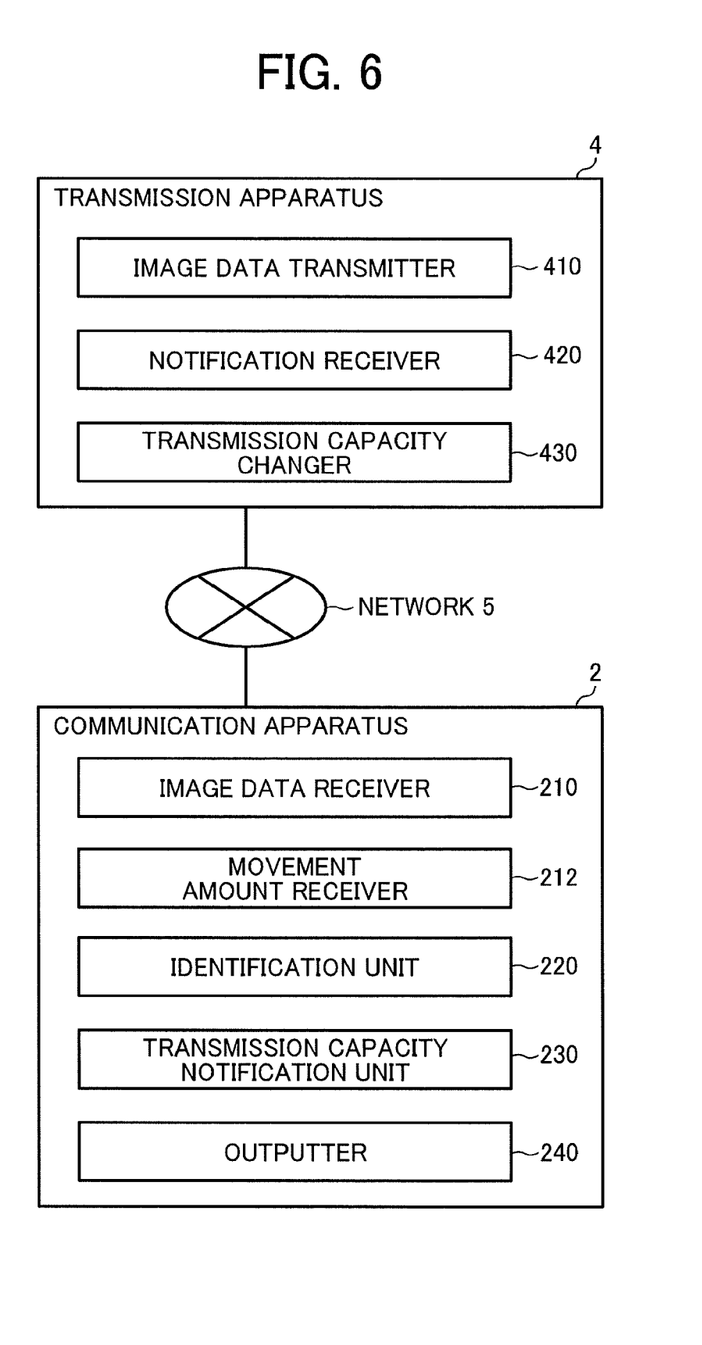
FIG. 6 is a block diagram illustrating functional configurations of the communication apparatus and the transmission apparatus according to still another embodiment of the present application.

Hereinafter, a description is given of the communication system 1 according to still another embodiment of the present invention. A description of elements, members, components, or operations that are same as those of the embodiment described above with reference to FIGS. 1 to 4A and 4B is omitted below. FIG. 6 is a block diagram illustrating functional configurations of the communication apparatus 2 and the transmission apparatus 4 according to the present embodiment. As illustrated in FIG. 6, the communication apparatus 2 according to the present embodiment includes a coordinate movement amount receiver 212 in addition to the functional blocks of FIG. 3.

The coordinate movement amount receiver 212 receives, from the transmission apparatus 4, an amount of movement in coordinates of an input from the pointing device of the transmission apparatus 4 operated when modifying the image data. The coordinate movement amount receiver 212 is implemented by the communication device 24 operating under control of the information processor 21 according to the predetermined program.

Figure 7:
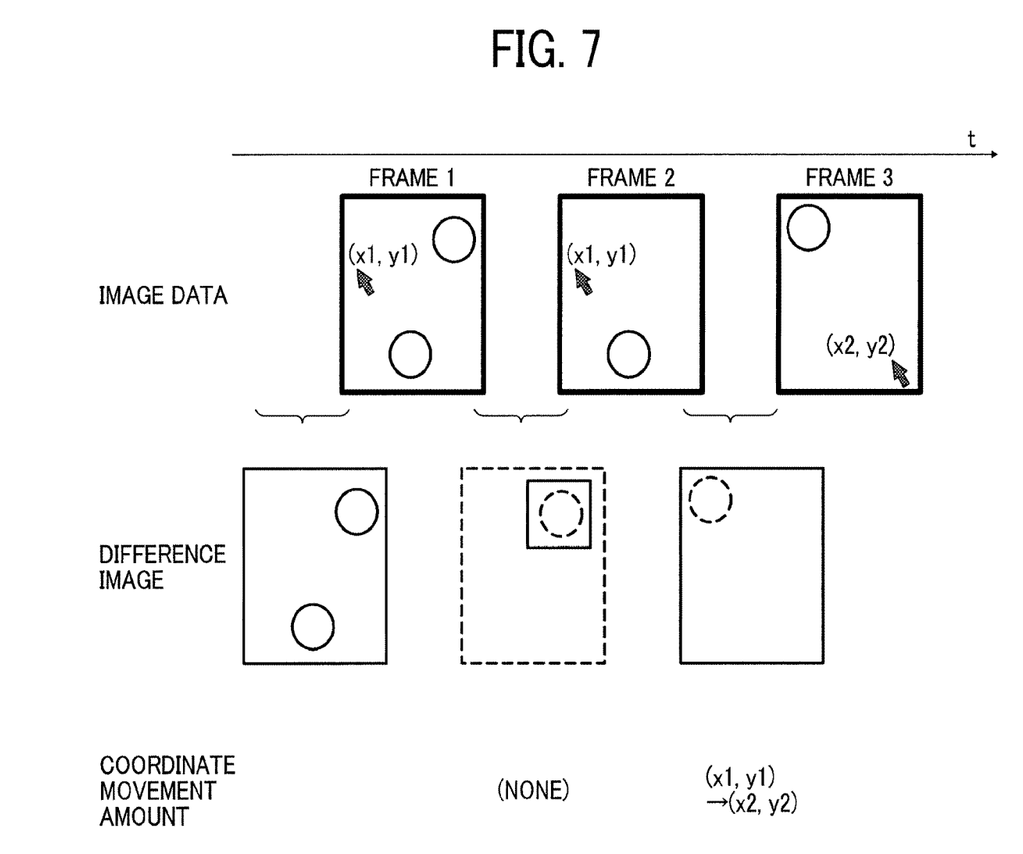
FIG. 7 is an illustration for describing a relation between image data and an amount of movement in coordinates according to an embodiment of the present invention.

Hereinafter, a description is given of the amount of movement in coordinates according to the present embodiment with reference to FIG. 7. FIG. 7 is an illustration for describing a relation between the image data and the amount of movement in coordinates. In FIG. 7, three pieces of the image data generated in the transmission apparatus 4 are illustrated, in order from left to right of Frame 1, Frame 2, and Frame 3. Further, in FIG. 7, the difference image between a target frame and the precedent frame is illustrated. Furthermore, the difference between the coordinates of the pointing device in a target frame and the coordinates of the pointing device in the precedent frame is illustrated. This difference corresponds to the amount of movement in the coordinates between frames.

When an amount of movement of the pointing device in the transmission apparatus 4 is small, the change in the image is predicted to be small. Accordingly, the transmission capacity notification unit 230 notifies the transmission apparatus 4 that transmits the image data having the amount of movement in coordinates less than a predetermined threshold to reduce the transmission data capacity.

Further, the transmission capacity notification unit 230 may calculate the transmission data capacity based on a difference between data sizes of continuous image data. When the difference between the data sizes is more than or equal to a predetermined threshold, the image data is predicted to be important. Accordingly, the transmission capacity notification unit 230 notifies the transmission apparatus 4 that transmits the image data having a difference between the data sizes of less than the predetermined threshold to reduce the transmission data capacity.

Figure 8:
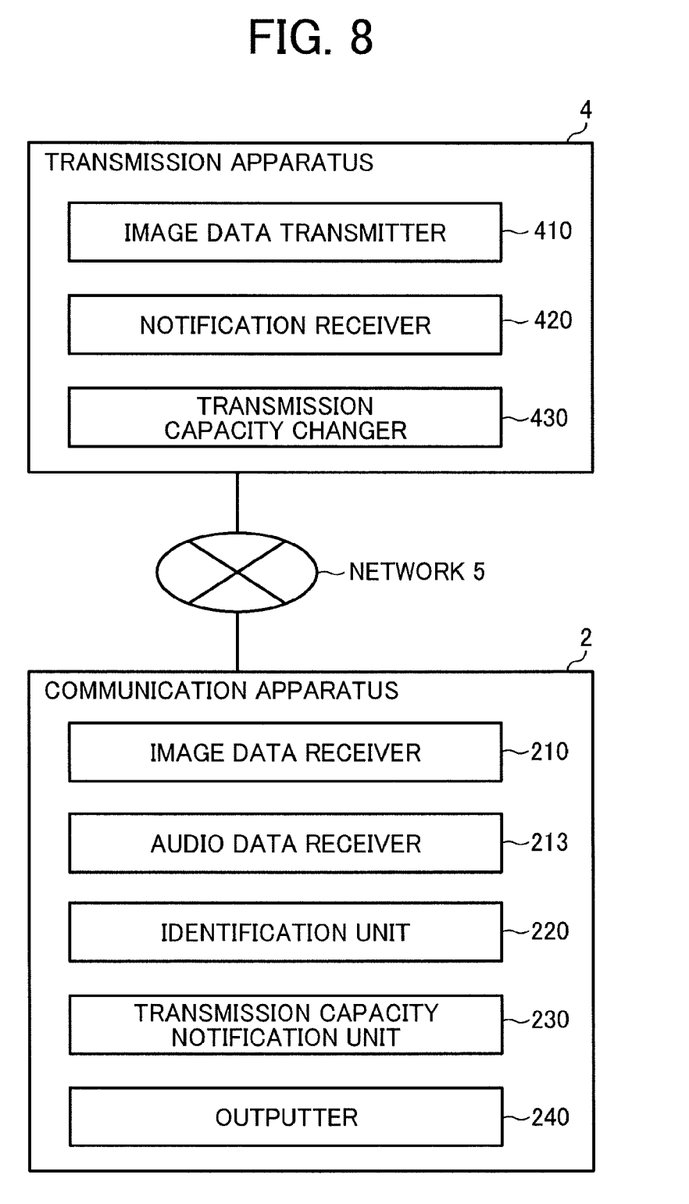
FIG. 8 is a block diagram illustrating functional configurations of the communication apparatus and the transmission apparatus according to still another embodiment of the present application.

Hereinafter, a description is given of the communication system 1 according to still another embodiment of the present invention. A description of elements, members, components, or operations that are same as those of the embodiment described above with reference to FIGS. 1 to 4A and 4B is omitted below. FIG. 8 is a block diagram illustrating functional configurations of the communication apparatus 2 and the transmission apparatus 4 according to the present embodiment. As illustrated in FIG. 8, the communication apparatus 2 according to the present embodiment includes an audio data receiver 213 in addition to the functional blocks of FIG. 3.

The audio data receiver 213 receives audio data transmitted from the transmission apparatus 4. The audio data receiver 213 is implemented by the communication device 24 operating under control of the information processor 21 according to the predetermined program.

The image data accompanied with audio data is estimated to be important. Accordingly, it is preferable not to reduce the transmission data capacity for the image data transmitted from the transmission apparatus 4 that transmits audio data. Therefore, the transmission capacity notification unit 230 notifies the transmission apparatus 4 that does not transmit audio data received by the audio data receiver 213 to reduce the transmission data capacity.

Figure 9:
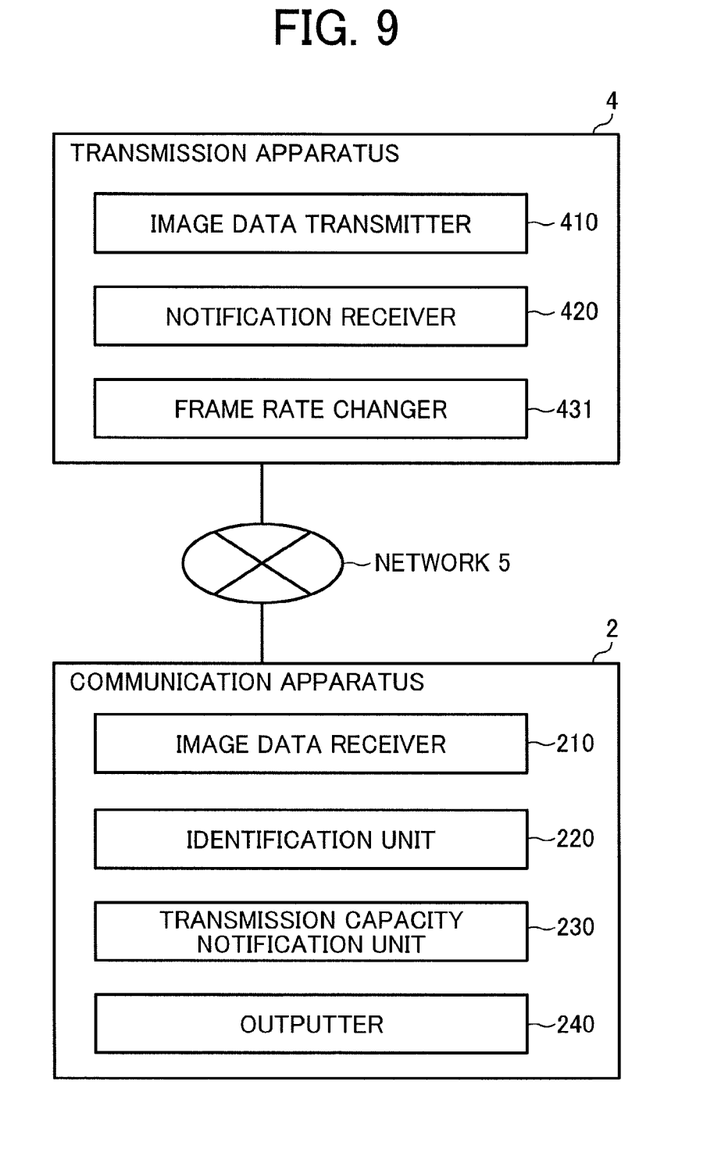
FIG. 9 is a block diagram illustrating functional configurations of the communication apparatus and the transmission apparatus according to still another embodiment of the present application.

Hereinafter, a description is given of the communication system 1 according to still another embodiment of the present invention. A description of elements, members, components, or operations that are same as those of the embodiment described above with reference to FIGS. 1 to 4A and 4B is omitted below. FIG. 9 is a block diagram illustrating functional configurations of the communication apparatus 2 and the transmission apparatus 4 according to the present embodiment. As illustrated in FIG. 9, the transmission apparatus 4 according to the present embodiment includes a frame rate changer 431 instead of the transmission capacity controller 430 of FIG. 3.

The frame rate changer 431 changes a frame rate of the image data based on the notification from the communication apparatus 2 to change the transmission data capacity. The frame rate changer 431 is implemented by the information processor 41 when executing the predetermined program.

At S44 in the flowchart of FIG. 4A, the transmission apparatus 4 according to the present embodiment changes the frame rate in response to receiving the notification of the transmission data capacity from the communication apparatus 2. In this case, the transmission capacity notification unit 230 of the communication apparatus 2 according to the present embodiment may notify the transmission apparatus 4 of the frame rate at which the transmission apparatus 4 transmits the image data instead of the transmission data capacity to be used for transmission of the image data.

Hereinafter, a description is given of the communication system 1 according to still another embodiment of the present invention. The communication system according to the present embodiment is implemented by the communication apparatus 2 and the transmission apparatus 4 having the same or substantially the same functional blocks as those of FIG. 5. Therefore, a description of elements, members, components, or operations that are same as those of the embodiment described above with reference to FIG. 5 is omitted below.

Figure 10:
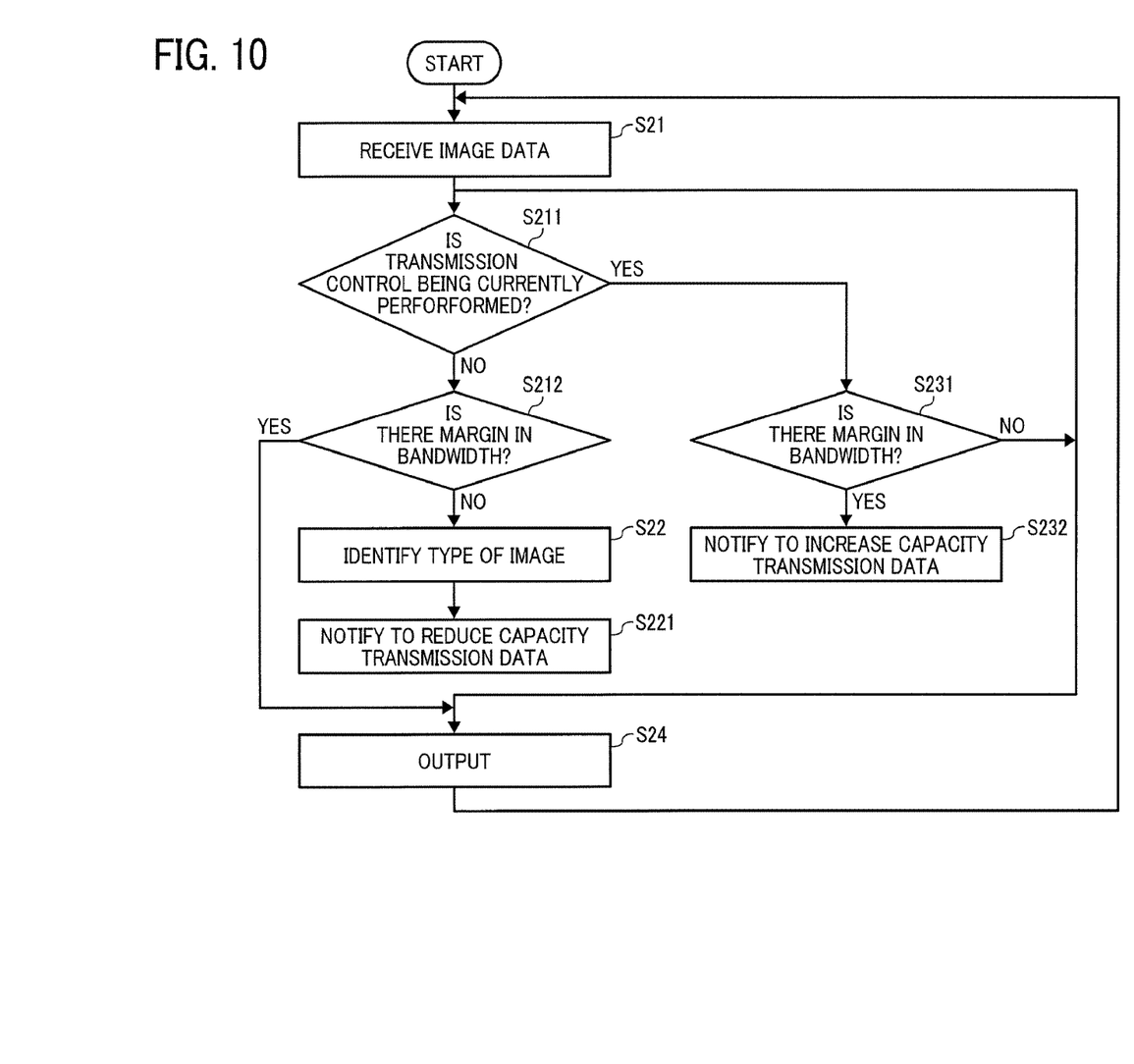
FIG. 10 is a flowchart illustrating steps in an operation performed by the communication apparatus according to still another embodiment of the present invention.

Hereinafter, a description is given of steps in an operation performed by the communication apparatus 2 according to the present embodiment with reference to flowchart of FIG. 10. A description of elements, members, components, or operations that are same as those of the embodiment described above with reference to FIG. 5 is omitted below. In response to receiving the image data, the communication apparatus 2 determines whether the transmission capacity control is currently being performed on the transmission of the image data (S211). For example, the reception data bandwidth detector 211 checks whether the transmission capacity notification unit 230 has already notified the transmission apparatus 4 of the transmission data capacity to determine whether the transmission capacity control is currently being performed on the transmission of the image data.

When the reception data bandwidth detector 211 determines that the transmission capacity control is currently being performed on the transmission of the image data (S211: YES), the reception data bandwidth detector 211 determines whether the transmission of the image data is being performed in a state in which there is spare capacity in the data bandwidth (S231). When the reception data bandwidth detector determines that there is spare capacity in the data bandwidth (S231: YES), the communication apparatus 2 instructs the transmission apparatus 4 to increase the transmission capacity (S232).

For example, the reception data bandwidth detector 211 compares the detected reception data bandwidth with a predetermined lower limit to determine whether there is spare capacity in the data bandwidth. In other words, when the reception data bandwidth is less than the predetermined lower limit, the reception data bandwidth detector 211 determines that there is spare capacity in the reception data bandwidth. The transmission capacity notification unit 230 notifies the transmission apparatus 4 of the transmission data capacity that is larger than the current transmission data capacity to increase the transmission capacity. For example, the transmission capacity notification unit 230 notifies the transmission apparatus 4 of the transmission data capacity that was used for transmission of the image data before the transmission capacity control is performed.

When the communication apparatus 2 determines that the transmission capacity control is not currently being performed on the transmission of the image data (S211: NO), the communication apparatus 2 determines whether the transmission of the image data is being performed in a state in which there is spare capacity in the data bandwidth (S212). When the communication apparatus 2 determines that there is no or substantially no spare capacity in the data bandwidth (S212: NO), the communication apparatus 2 instructs the transmission apparatus 4 to decrease the transmission capacity based on the type of the image identified at S22 (S221).

When the communication apparatus 2 determines the transmission of the image data is performed in a state there is no or substantially no spare capacity in the data bandwidth (S231: NO) while the transmission capacity control is currently being performed (S211: YES), the communication apparatus 2 continues transmission of the image data without changing the transmission capacity. In addition, when the communication apparatus 2 determines the transmission of the image data is performed in a state there is spare capacity in the data bandwidth (S212: YES) while the transmission capacity control is not currently being performed (S211: NO), the communication apparatus 2 continues transmission of the image data without changing the transmission capacity. The output (display) of the image data is performed concurrently (S24).

In the present embodiment, the transmission apparatus 4 may change the frame rate to change the transmission data capacity in substantially the same manner as the embodiment described above with reference to FIG. 9.

As described heretofore, the transmission apparatus 4 transmits the image data to the communication apparatus 2, which outputs the received image data to the display apparatus 3 to cause the display apparatus 3 to display the image based on the image data. According to any one of the above embodiments, alone or in combination, even when the transmission apparatus 4 does not attach, to the image data, information identifying the type of the image data, the image data is communicated to the communication apparatus 2 with the frame rate suitable for each image data.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

What is claimed is:

1. A communication apparatus, comprising:
   a receiver to receive first image data from a transmission apparatus; and
   circuitry to:
   determine, by analyzing the received first image data, an image data type of the received first image data from among a plurality of image data types;
   determine a transmission data capacity to be used for transmission of second image data at the transmission apparatus based on the determined image data type of the received first image data;
   send a notification to the transmission apparatus, the notification requesting the transmission apparatus to transmit the second image data based on the determined transmission data capacity; and
   output the second image data that the transmission apparatus transmits based on the notified transmission data capacity.

2. The communication apparatus of claim 1, wherein:
   the circuitry is further configured to detect a bandwidth to be used for reception of the second image data at the communication apparatus; and
   wherein the notification is sent to the transmission apparatus in response to a detection indicating that the bandwidth exceeds a predetermined threshold.

3. The communication apparatus of claim 2, wherein the notification sent by the circuitry requests the transmission apparatus to increase the transmission data capacity in response to a detection indicating that the bandwidth is less than a predetermined lower limit.

4. The communication apparatus of claim 1, wherein the notification sent by the circuitry requests the transmission apparatus to reduce the transmission data capacity when the determined image data type of the first image data received from the transmission apparatus is identified as non-text image data.

5. The communication apparatus of claim 1, wherein:
   the first image data is continuously received from the transmission apparatus; and
   the notification requests the transmission apparatus to reduce the transmission data capacity when a difference area between continuous image data received from the transmission apparatus has a size exceeding a predetermined threshold.

6. The communication apparatus of claim 5, wherein the notification sent by the circuitry requests the transmission apparatus to reduce the transmission data capacity when the first image data received from the transmission apparatus has a data size exceeding a predetermined threshold.

7. The communication apparatus of claim 1, wherein:
   the receiver is further configured to receive an amount of movement in coordinates of an input from a pointing device when modifying the first image data; and
   the notification sent by the circuitry requests the transmission apparatus to reduce the transmission data capacity when the amount of movement in coordinates is less than a predetermined threshold.

8. The communication apparatus of claim 7, wherein the notification sent by the circuitry requests the transmission apparatus to reduce the transmission data capacity when a difference in data size between continuous first image data received from the transmission apparatus is less than a predetermined threshold.

9. The communication apparatus of claim 1, wherein
   the receiver is further configured to receive audio data from the transmission apparatus, and
   the notification sent by the circuitry requests the transmission apparatus that transmits the first image data that is not accompanied by the audio data to reduce the transmission data capacity.

10. The communication apparatus of claim 1, wherein the notification sent by the circuitry requests the transmission apparatus to transmit the second image data based on a frame rate to be used for transmission of the second image data.

11. The communication apparatus of claim 1, wherein the notification sent by the circuitry requests the transmission apparatus to transmit the second image data based on the transmission data capacity that is determined based on a determination as to whether the first image data received from the transmission apparatus is monochrome binary data, monochrome multivalent data, or color image data.

12. The communication apparatus of claim 1, wherein the circuitry is further configured to determine the image data type by analyzing a predetermined portion of the first image data.

13. A communication system comprising a transmission apparatus and a communication apparatus,
the communication apparatus including:
    a first receiver to receive first image data from the transmission apparatus; and
    first circuitry to:
        determine, by analyzing the received first image data, an image data type of the received first image data from among a plurality of image data types;
        determine the transmission data capacity to be used for transmission of second image data based on the determined image data type of the received first image data; and
        send a notification to the transmission apparatus, the notification requesting the transmission apparatus to the second image data based on the determined transmission data capacity, and
the transmission apparatus including:
    a transmitter to transmit the first and second image data to the communication apparatus;
    a second receiver to receive the notification from the communication apparatus; and
    second circuitry to change the transmission data capacity when transmitting the second image data to the communication apparatus,
wherein the communication apparatus outputs the second image data that the transmission apparatus transmits based on the notified transmission data capacity.

14. A method for controlling data communication, comprising:
receiving first image data from a transmission apparatus;
determining, by analyzing the received first image data, an image data type of the received first image data from among a plurality of image data types;
determining a transmission data capacity to be used for transmission of second image data at the transmission apparatus based on the determined image data type of the received first image data;
sending a notification to the transmission apparatus, the notification requesting the transmission apparatus to transmit the second image data based on the determined transmission data capacity; and
outputting the second image data that the transmission apparatus transmits based on the notified transmission data capacity.

* * * * *